United States Patent
Tohzaka et al.

(10) Patent No.: US 9,204,321 B2
(45) Date of Patent: Dec. 1, 2015

(54) WIRELESS COMMUNICATION APPARATUS

(71) Applicant: KABUSHIKI KAISHA TOSHIBA, Minato-ku, Tokyo (JP)

(72) Inventors: Yuji Tohzaka, Kawasaki (JP); Hiroki Kudo, Kawasaki (JP); Hiroyuki Kitagawa, Yokohama (JP); Takafumi Sakamoto, Machida (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 174 days.

(21) Appl. No.: 13/836,311

(22) Filed: Mar. 15, 2013

(65) Prior Publication Data

US 2014/0071807 A1 Mar. 13, 2014

(30) Foreign Application Priority Data

Sep. 12, 2012 (JP) .................................. 2012-200481

(51) Int. Cl.
 H04W 24/04 (2009.01)
 H04W 84/20 (2009.01)
 H04W 48/20 (2009.01)
 H04W 76/02 (2009.01)

(52) U.S. Cl.
 CPC ............. *H04W 24/04* (2013.01); *H04W 48/20* (2013.01); *H04W 84/20* (2013.01); *H04W 76/025* (2013.01)

(58) Field of Classification Search
 USPC .................. 370/216, 254, 255; 455/41.2, 507; 709/208, 209
 See application file for complete search history.

(56) References Cited

U.S. PATENT DOCUMENTS

| 2001/0019956 A1* | 9/2001 | Tada .............................. 455/434 |
| 2002/0055978 A1* | 5/2002 | Joon-Bo et al. ............... 709/209 |
| 2002/0098841 A1 | 7/2002 | Treister et al. |
| 2002/0159401 A1* | 10/2002 | Boger ........................... 370/294 |
| 2003/0054821 A1 | 3/2003 | Kita et al. |
| 2003/0063655 A1* | 4/2003 | Young ........................... 375/132 |
| 2005/0143046 A1* | 6/2005 | Suzuki ........................ 455/343.2 |
| 2005/0262216 A1* | 11/2005 | Kashiwabara et al. ....... 709/208 |

(Continued)

FOREIGN PATENT DOCUMENTS

| JP | 2003092578 A | 3/2003 |
| JP | 2003-229892 A | 8/2003 |
| JP | 2007150712 A | 6/2007 |

(Continued)

OTHER PUBLICATIONS

Japanese Office Action dated Aug. 5, 2014, issued in counterpart Japanese Application No. 2012-200481.

*Primary Examiner* — Edan Orgad
*Assistant Examiner* — Saumit Shah
(74) *Attorney, Agent, or Firm* — Holtz, Holtz, Goodman & Chick PC

(57) ABSTRACT

According to one embodiment, a wireless communication apparatus includes a management unit and a setting unit. The setting unit sets, upon determination of disconnection of a wireless link with a base station of a main network used for communication, duration for waiting for receiving a first signal related to formation of a new network based on a priority. The management unit, when the duration is set, waits for receiving the first signal until the duration elapses. The setting unit switches an operation mode to a base station mode if the first signal is not received even the duration elapses. The management unit repeatedly performs a process to transmit the first signal after the operation mode is switched to the base station mode.

7 Claims, 7 Drawing Sheets

(56) References Cited

U.S. PATENT DOCUMENTS

2009/0240781 A1  9/2009  Otsuka
2011/0235561 A1  9/2011  Liu et al.

FOREIGN PATENT DOCUMENTS

JP    2008-060711 A    3/2008
JP    2012511290 A     5/2012

* cited by examiner

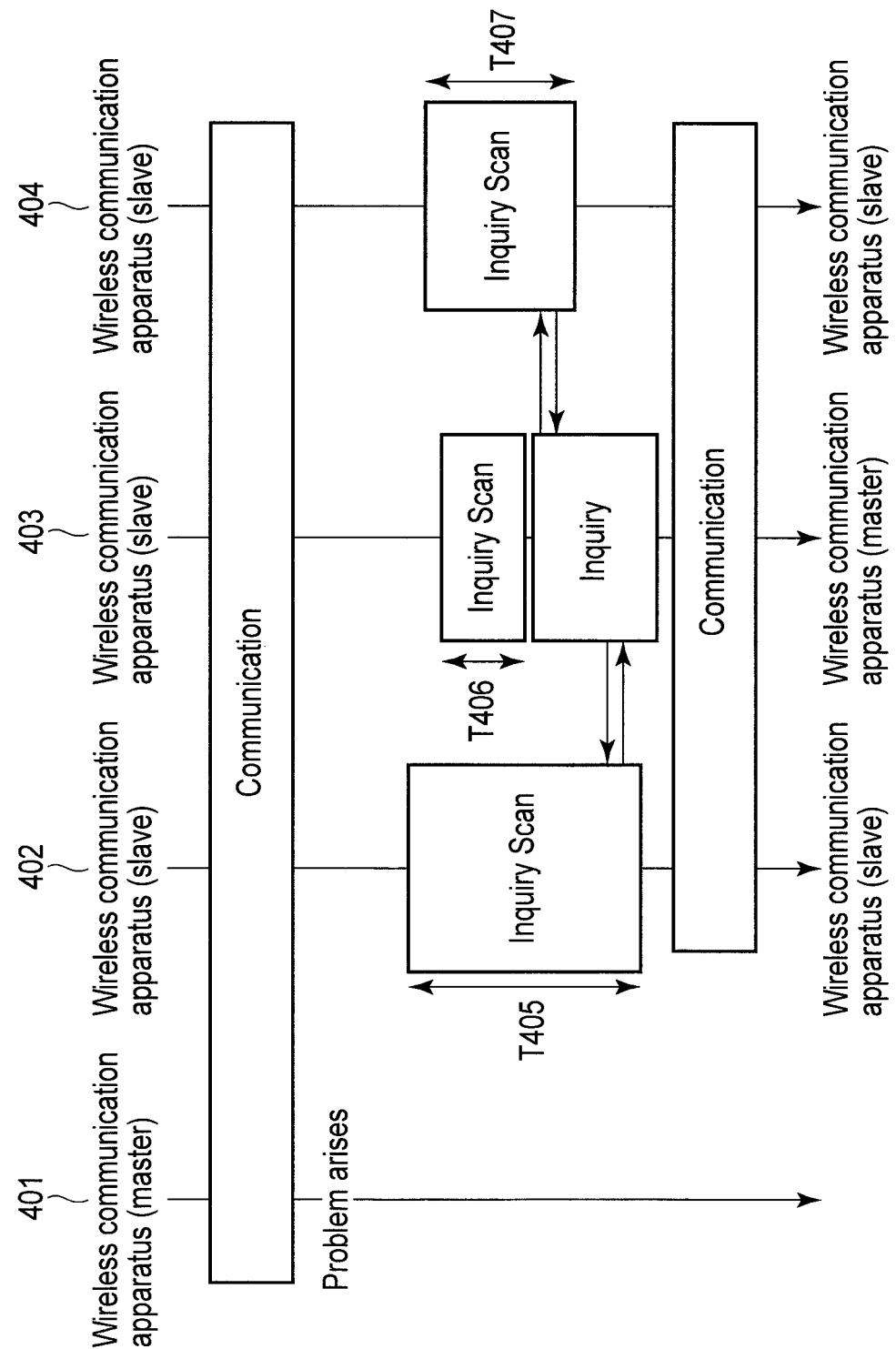
F I G. 5

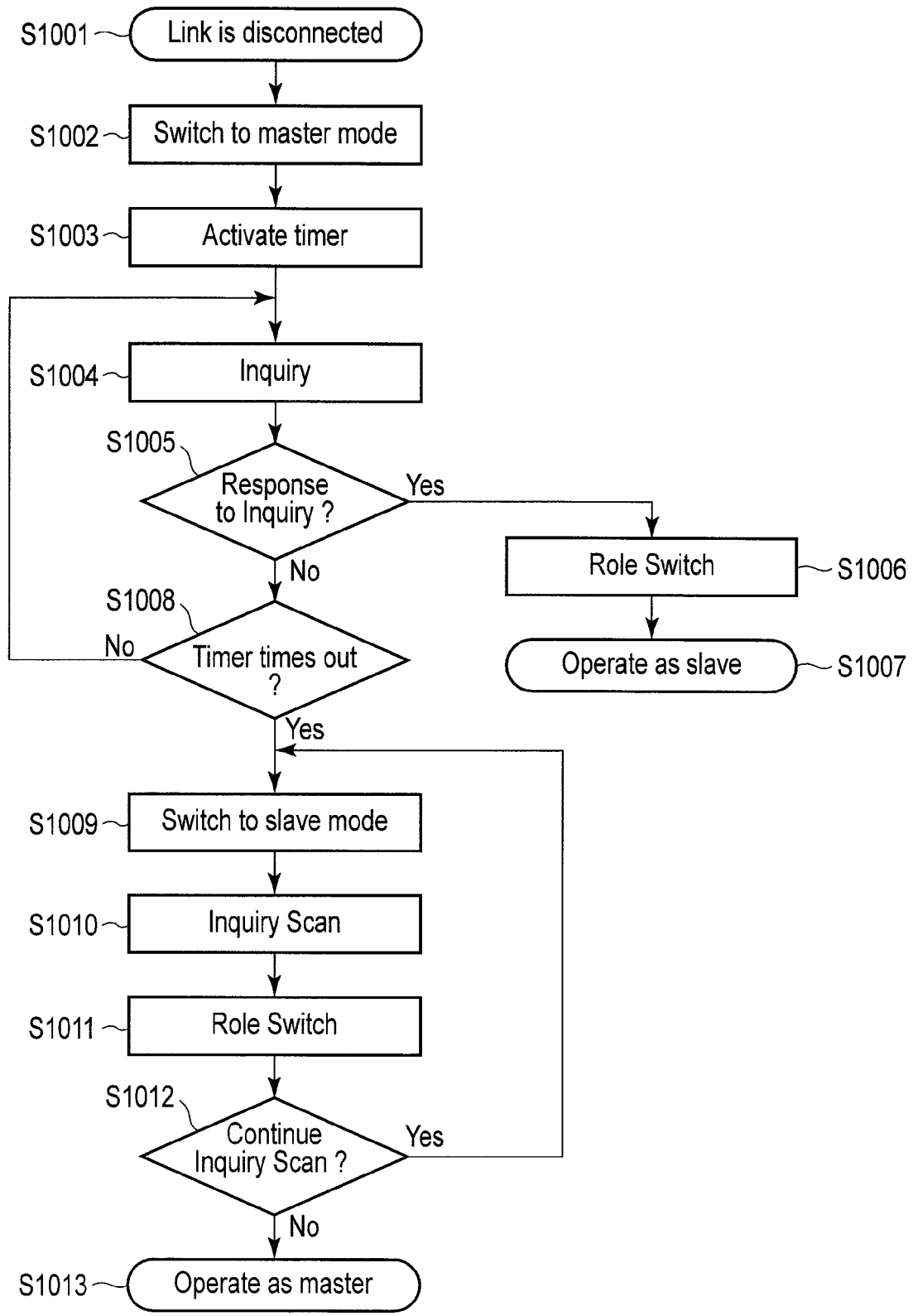
F I G. 11

WIRELESS COMMUNICATION APPARATUS

CROSS-REFERENCE TO RELATED APPLICATIONS

This application is based upon and claims the benefit of priority from Japanese Patent Application No. 2012-200481, filed Sep. 12, 2012, the entire contents of which are incorporated herein by reference.

FIELD

Embodiments described herein relate generally to wireless communication

BACKGROUND

A technique of continuing communication via an alternative path in the event of a problem at a radio relay device in a wireless communication system utilizing radio relay has been proposed.

A type of wireless communication system based on Bluetooth and wireless local area network (LAN), etc., has a base station that serves as a center of network and a terminal station that forms a wireless link with the base station. Herein, a base station is equivalent to a master in Bluetooth, or an access point (AP) in wireless LAN. A terminal station is equivalent to a slave in Bluetooth or a station (STA) in wireless LAN Generally in such a network, it is not easy to continue communications when a problem occurs at the base station. For example, in order to continue communications in the event of such a problem, it is possible to set address information designating a terminal station in place of address information designating the base station in a packet header to be transmitted from a different terminal station. Even if such a procedure is taken, however, the terminal station which receives the packet cannot operate as a base station. Furthermore, it is required that the base station maintains good wireless links with more than one terminal station. However, it is not easy to quickly specify a terminal station that satisfies this condition.

BRIEF DESCRIPTION OF THE DRAWINGS

FIG. 5 is a sequence chart illustrating the operation of the wireless communication apparatus according to the first embodiment when a problem occurs at a master.

FIG. 11 is a flowchart illustrating a variation of the operation shown in FIG. 4.

DETAILED DESCRIPTION

In the following, the embodiments will be explained with reference to the drawings.

In general, according to one embodiment, a wireless communication apparatus includes a management unit and a setting unit. The management unit manages wireless links. The setting unit sets system parameters. The setting unit sets, upon determination of disconnection of a wireless link with a base station of a main network used for communication, duration for waiting for receiving a first signal related to formation of a new network based on a priority. The management unit, when the duration is set, waits for receiving the first signal until the duration elapses. The setting unit switches an operation mode to a base station mode if the first signal is not received even the duration elapses. The management unit repeatedly performs a process to transmit the first signal after the operation mode is switched to the base station mode.

For brevity of explanation, a Bluetooth system is adopted in the embodiment described below. However, the embodiment is applicable not only to a Bluetooth system but to other wireless communication systems having a similar network topology (for example, a wireless LAN system).

Each embodiment will be explained on the assumption that all wireless communication apparatuses forming network are based on each embodiment; however, some of the wireless communication apparatuses forming network can be replaced with one that is not based on the embodiment.

In the following, the same elements are referred to by the same respective reference numbers. Redundant explanation will be avoided.

(First Embodiment)

Figure 1:
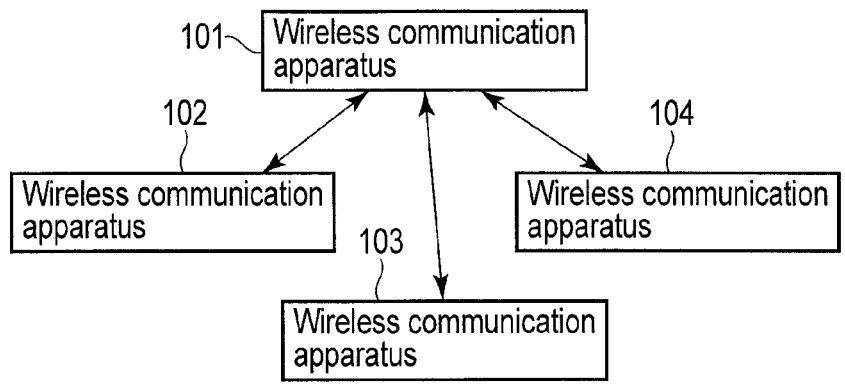
FIG. 1 shows a network formed by a wireless communication apparatus according to the first embodiment.

Wireless communication apparatuses 101, 102, 103, 104 according to the first embodiment form a network for communications (hereinafter, referred to as "a main network") as shown in FIG. 1. According to the example illustrated in FIG. 1, wireless communication apparatus 101 operates as a master, and wireless communication apparatuses 102, 103 and 104 operate as slaves.

Figure 2:
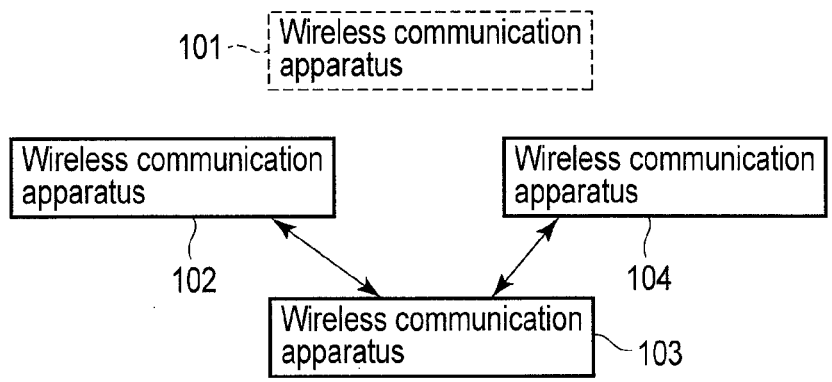
FIG. 2 shows a network formed when a problem occurs at a wireless communication apparatus 101 in the network illustrated in FIG. 1.

Wireless communication apparatuses 102, 103 and 104 (slaves) can continue communication by forming a new network autonomously if a problem (for example, a breakdown) occurs at wireless communication apparatus 101 (master). Specifically, wireless communication apparatuses 102, 103 and 104 (slaves) operate in a manner as will be described later in order to determine a new master (wireless communication apparatus 103 in the example of FIG. 2), then a new network having the new master as its center will be formed.

Figure 3:
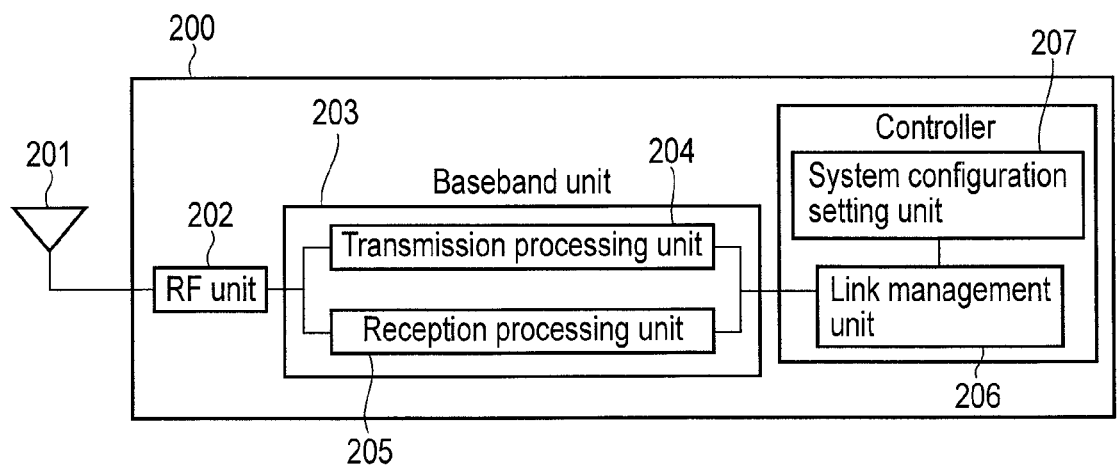
FIG. 3 is a block diagram illustrating a wireless communication apparatus according to the first embodiment.

A wireless communication apparatus 200 according to the present embodiment (corresponding to wireless communication apparatuses 101, 102, 103 and 104, for example) comprises an antenna 201, a radio-frequency (RF) unit 202, a baseband unit 203, and a controller as shown in FIG. 3. The baseband unit 203 comprises a transmission processing unit 204 and a reception processing unit 205. The controller comprises a link management unit 206 and a system configuration setting unit 207. The operation mode of wireless communication apparatus 200 can be switched between a slave mode and a master mode.

The antenna 201 may be an internal element in wireless communication apparatus 200, or be an external element. The antenna 201 emits RF signals input from the RF unit 202 into space. The antenna 201 receives RF signals emitted from other wireless communication apparatuses, and provides the received RF signals to the RF unit 202.

The RF unit 202 comprises an analog signal processing circuit common in wireless communication. The RF unit 202 may comprise, for example, a low-noise amplifier (LNA), a mixer (MIX), a voltage controlled oscillator (VCO), a power amplifier (PA), an analog-to-digital converter (ADC), a filter, and so on.

The RF unit 202 inputs the received RF signals from the antenna 201. The RF unit 202 performs an analog signal processing, such as low-noise amplification, down-conversion, filtering and analog-to-digital conversion on the RF signal to generate a received baseband signal. The RF unit 202 outputs the received baseband signal to the reception processing unit 205.

The RF unit 202 inputs a baseband signal from the transmission processing unit 204. The RF unit 202 performs an analog signal processing, such as digital-to-analog conversion, up-conversion, filtering and power amplification to generate RF signals. The RF unit 202 outputs the RF signals to the antenna 201.

The transmission processing unit 204 performs a transmission processing on packets (for example, a control packet and a data packet). More specifically, the transmission processing unit 204 performs a transmission processing, such as cyclic redundancy code (CRC) addition, encryption, whitening, error correction encoding (i.e., forward error correction [FEC]) to generate a baseband signal. The transmission processing unit 204 outputs the baseband signal to the RF unit 202.

The reception processing unit 205 inputs a received baseband signal from the RF unit 202. The reception processing unit 205 performs a reception processing on packets. Specifically, the reception processing unit 205 performs a reception processing on the received baseband signal, such as correlation detection, error correction decoding, de-whitening, decryption and error detection, in order to reconstruct a packet.

The link management unit 206 manages wireless links. For example, the link management unit 206 sets up and controls wireless links. The link management unit 206 may conduct Inquiry or Inquiry Scan, as will be described later. The link management unit 206 may conduct a survey of a wireless link status by measuring channel information such as a packet error rate and a received power.

The system configuration setting unit 207 sets system parameters (particularly, for the link management unit 206). For example, the system configuration setting unit 207 switches the operation mode of wireless communication apparatus 200 between a master mode and a slave mode.

For example, when wireless communication apparatus 200 is in a slave mode, the system configuration setting unit 207 may control various system parameters based on a master candidate priority (will be described later) that the unit stores. The master candidate priority is an evaluation on suitability of wireless communication apparatus 200 for a master. The master candidate priority can be manually set by an operator or user, or autonomously set through a network as will be described later. The system configuration setting unit 207 may determine a master candidate priority for the other wireless communication apparatuses (slaves) while wireless communication apparatus 200 is in a master mode.

Figure 4:
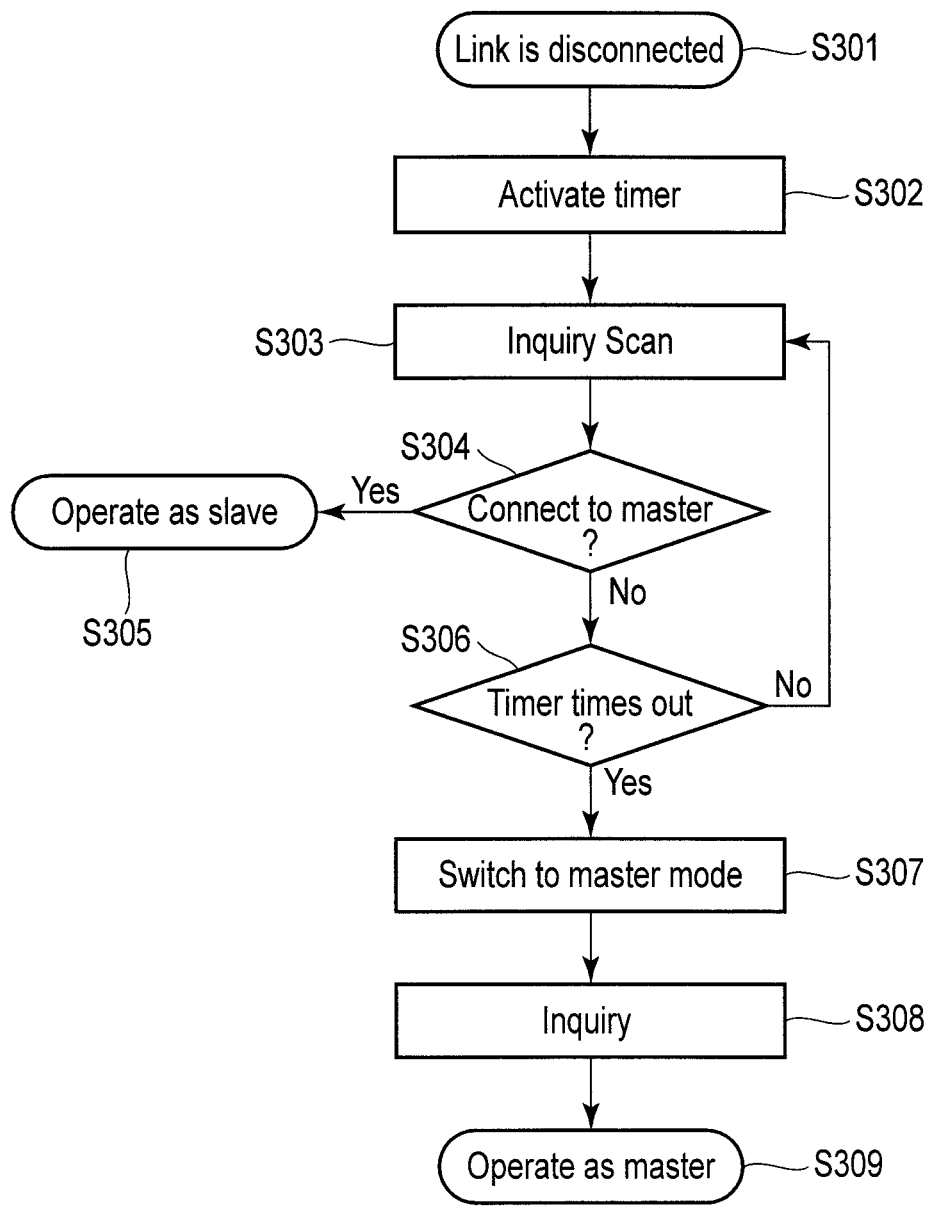
FIG. 4 is a flowchart illustrating the operation of the wireless communication apparatus as shown in FIG. 3 when a wireless link with a master is disconnected.

Wireless communication apparatus 200 operates in a manner as shown in FIG. 4 when a problem arises in a main network master during the slave mode. According to the example in FIG. 4, a problem at a main network master can be detected when wireless communication apparatus 200 determines that a wireless link is disconnected (step S301).

Determination of disconnection of a wireless link may be made by the link management unit 206 when a packet error rate at a wireless link between wireless communication apparatus 200 and a master exceeds a threshold, or when a reception power of a signal from wireless communication apparatus 200 is lower than a threshold.

After step S301, the system configuration setting unit 207 determines a set time of a timer and activates the timer (step S302). The set time defines duration of Inquiry Scan (step S303) (will be described later).

The system configuration setting unit 207 may determine a set time based on a master candidate priority. The process proceeds to step S303 after step S302.

In step S303, the link management unit 206 conducts Inquiry Scan. Inquiry Scan is an operation of waiting for, from a wireless communication apparatus that operates as a master, a signal related to the formation of a new network. The signal is called an Inquiry (IQ) packet in Bluetooth. A master transmits an IQ packet repeatedly. When a slave receives an IQ packet during the Inquiry Scan, the slave tries to connect to the master.

If wireless communication apparatus 200 succeeds in connecting to the master before the timer times out (step S304), wireless communication apparatus 200 start operating as a slave from now on (step S305). If the timer times out before wireless communication apparatus 200 succeeds in connecting to the master (step S306), the process proceeds to step S307.

In the step S307, the system configuration setting unit 207 switches the operation mode to a master mode. Then, the link management unit 206 conducts Inquiry by transmitting an IQ packet repeatedly (step S308). In step S308, if a wireless communication apparatus (slave) is connected to wireless communication apparatus 200, wireless communication apparatus 200 starts to operate as a master (step S309) from now on.

It can be assumed that there is a case where the limit of the duration of step S308 comes before a connection between any other wireless communication apparatuses (slaves) and wireless communication apparatus 200 is established. Such a case is considered as an irregular termination; thus, any exceptional process may be performed. For example, the process can return to step S302 after the system configuration setting unit 207 switches the operation mode to a slave mode, or a process that is not described herein may be performed after the system configuration setting unit switches the operation mode to a slave mode.

According to the process illustrated in FIG. 4, the shorter the set time in step S302 is (in other words, the duration of Inquiry Scan), the earlier wireless communication apparatus 200 performs the process in or after step S307.

For this reason, it is preferable to determine a shorter set time of a timer if the master candidate priority is higher. For example, if wireless communication apparatus 200 has the highest master candidate priority, the timer may be set to zero. In other words, for the wireless communication apparatus with the highest master candidate priority, the process from step S302 through step S306 may be skipped. According to Bluetooth, the set time is controllable with a parameter called "Inquiry_Scan_Window."

Wireless communication apparatuses 401, 402, 403 and 404 according to the present embodiment can operate in a manner as shown in FIG. 5. In the example illustrated in FIG. 5, suppose that wireless communication apparatus 401 initially operates as a master, and wireless communication apparatuses 402, 403 and 404 initially operate as slaves.

As shown in FIG. 5, suppose that wireless communication apparatus 401 suffers a breakdown while wireless communication apparatuses 401, 402, 403 and 404 perform communications. The breakdown of wireless communication apparatus 401 is detected when each of wireless communication apparatuses 402, 403 and 404 determines a disconnection of a wireless link with wireless communication apparatus 401. Then, wireless communication apparatuses 402, 403 and 404 perform the process shown in FIG. 4. It should be noted that wireless communication apparatuses 402, 403 and 404 detect the breakdown individually, the timing of starting the process does not necessarily correspond among those wireless communication apparatuses 402, 403 and 404.

Herein, suppose that among the wireless communication apparatuses 402, 403 and 404, the wireless communication apparatus 403 has the highest master candidate priority, the wireless communication apparatus 404 has the second highest master candidate priority, and the wireless communication apparatus 402 has the lowest master candidate priority. In this case, thus, in step S302, the wireless communication apparatus 403 determines a shortest set time (T406), the wireless communication apparatus 403 determines a second shortest set time (T407), and the wireless communication apparatus 404 determines a longest set time (T405).

As a result, the wireless communication apparatus 403 can conduct Inquiry at an earliest timing regardless of the longest delay in starting Inquiry Scan. Then, the wireless communication apparatuses (slaves) 404 and 402 are sequentially connected to the wireless communication apparatus (master) 403. In the end, a new network wherein the wireless communication apparatus 403 serves as a master is autonomously formed, and the communication among wireless communication apparatuses 402, 403 and 404 can continue.

In the examples shown in FIGS. 4 and 5, the wireless communication apparatus according to the present embodiment (for example, wireless communication apparatus 200) conducts Inquiry after conducting Inquiry Scan in order to form a network autonomously. However, in order to do so, the wireless communication apparatus according to the present embodiment may perform Inquiry Scan after conducting Inquiry.

More specifically, if a problem arises in the main network master while wireless communication apparatus 200 is in a slave mode, wireless communication apparatus 200 may operate in a manner as shown in FIG. 11. According to the example shown in FIG. 11, wireless communication apparatus 200 can detect a problem at a main network master by determining a disconnection with a wireless link (step S1001).

After step S1001, the system configuration setting unit 207 switches the operation mode to a master mode (step S1002). Then the system configuration setting unit 207 determines a set time of a timer and then activates the timer (step S1003). The set time determines the duration of the Inquiry in step S1004. Here, the system configuration setting unit 207 may determine the set time of the timer based on a master candidate priority. After step S1003, the process 4proceeds to step S1004.

In step S1004, the link management unit 206 conducts Inquiry. As described above, during the Inquiry, wireless communication apparatus 200 repeatedly transmits an IQ packet. If wireless communication apparatus 200 receives a response packet to the IQ packet before the timer times out, and the transmitter of the response packet, i.e., another wireless communication apparatuses (slave) connects to wireless communication apparatus 200 (step S1005), the process proceeds to step S1006.

In step S1006, wireless communication apparatus 200 and the wireless communication apparatus (slave) that was connected to wireless communication apparatus 200 in step S1005 switch their roles (step S1006). This switch of role is called "role switch" in Bluetooth. As a result of the role switch, the wireless communication apparatus (slave) starts operating as a master from now on, and wireless communication apparatus 200 starts operating as a slave from now on, and the communication therebetween continues (step S1007).

However, according to Bluetooth, it is not possible for a wireless communication apparatus to become a master in two or more networks (corresponding to piconet in Bluetooth) at the same time. For this reason, if the wireless communication apparatus (slave) has already been a piconet master in the above-described case, wireless communication apparatus 200 will participate in the piconet as a slave.

On the other hand, if the timer times out before any of the wireless communication apparatuses (slaves) connects to wireless communication apparatus 200, the process proceeds to step S1009. In step S1009, the system configuration setting unit 207 switches the operation mode to a slave mode. Then, the link management unit 206 conducts Inquiry Scan (step S1010).

In step S1010, if wireless communication apparatus 200 receives an IQ packet from another wireless communication apparatus (master), it attempts to connect to the wireless communication apparatus (master). Wireless communication apparatus 200 and the other wireless communication apparatus (master) connected to wireless communication apparatus 200 carries out role switch (step S1011). As a result of the role switch, the wireless communication apparatus (master) starts operating as a slave from now on, and wireless communication apparatus 200 starts operating as a master from now on, and the communication therebetween continues (step S1011).

As aforementioned, in Bluetooth, it is not possible for a wireless communication apparatus to become a master in two or more piconets at the same time. For this reason, if wireless communication apparatus 200 has already been a piconet master (in other words, the process in step S1011 has already been carried out at least once), the other wireless communication apparatus (master) will participate in the piconet as a slave.

Further, wireless communication apparatus 200 determines whether to continue Inquiry Scan after step S1011 or not (step S1012). If it is determined to continue Inquiry Scan, the process returns to step S1009, and if it is determined to finish Inquiry Scan, the process proceeds to step S1013. After step S1013, wireless communication apparatus 200 operates as a master, and the communication with the other wireless communication apparatus continues.

In step S1012, it is preferable that wireless communication apparatus 200 determines the termination of Inquiry Scan after all surrounding wireless communication apparatuses (slaves) are successfully connected to wireless communication apparatus 200.

To allow wireless communication apparatus 200 to make such a determination appropriately, information indicating the total number of wireless communication apparatuses active in a main network may be reported to the wireless communication apparatus 200 prior to the disconnection of the wireless link with the main network master (step S1001), for example.

Wireless communication apparatus 200 repeats Inquiry Scan the number of times given by subtracting 2 from the notified total number of active wireless communication apparatuses (in other words, excluding wireless communication apparatus 200 and the main network master). The information indicating the number of active wireless communication apparatuses may be reported only to a wireless communication apparatus having a master candidate priority higher than a threshold, or to some or all of the wireless communication apparatuses regardless of their master candidate priority.

Alternatively, wireless communication apparatus 200 may repeat Inquiry Scan tentatively. Wireless communication apparatus 200 may determine to continue Inquiry Scan as long as the apparatus 200 can receive response packets, and may determine to finish Inquiry Scan when it can no longer receive response packets.

According to the process shown in FIG. 11, the shorter the set time of the timer in step S1003 (in other words, the duration of Inquiry) is, the earlier wireless communication apparatus 200 carries out the process in or after step S1009. Further, although wireless communication apparatus 200 operates as a slave provisionally, when wireless communication apparatus 200 connects to a master, role switch is carried out. Thus, wireless communication apparatus 200 can eventually operate as a master.

For the above reason, it is preferable to determine a shorter time of a timer if a master candidate priority is higher. For example, if wireless communication apparatus 200 has the highest master candidate priority, the timer may be set to zero. In other words, for the wireless communication apparatus with the highest master candidate priority, the process from step S1002 through step S1008 may be skipped.

To avoid collision, a time interval between reception of an IQ packet in step S1010 and transmission of a response packet is determined using a random number. In other words, the shorter the time interval is, the earlier wireless communication apparatus 200 can perform role switch (step S1011). However, it should be noted that since the time interval is determined using a random number, direct control of the time interval is impossible. It is possible to control an expected value of the time interval by adjusting the upper limit of a random number. Accordingly, in case of a high master priority, it is preferable to set a small value for the upper limit of a random number used for determining the time interval.

Figure 6:
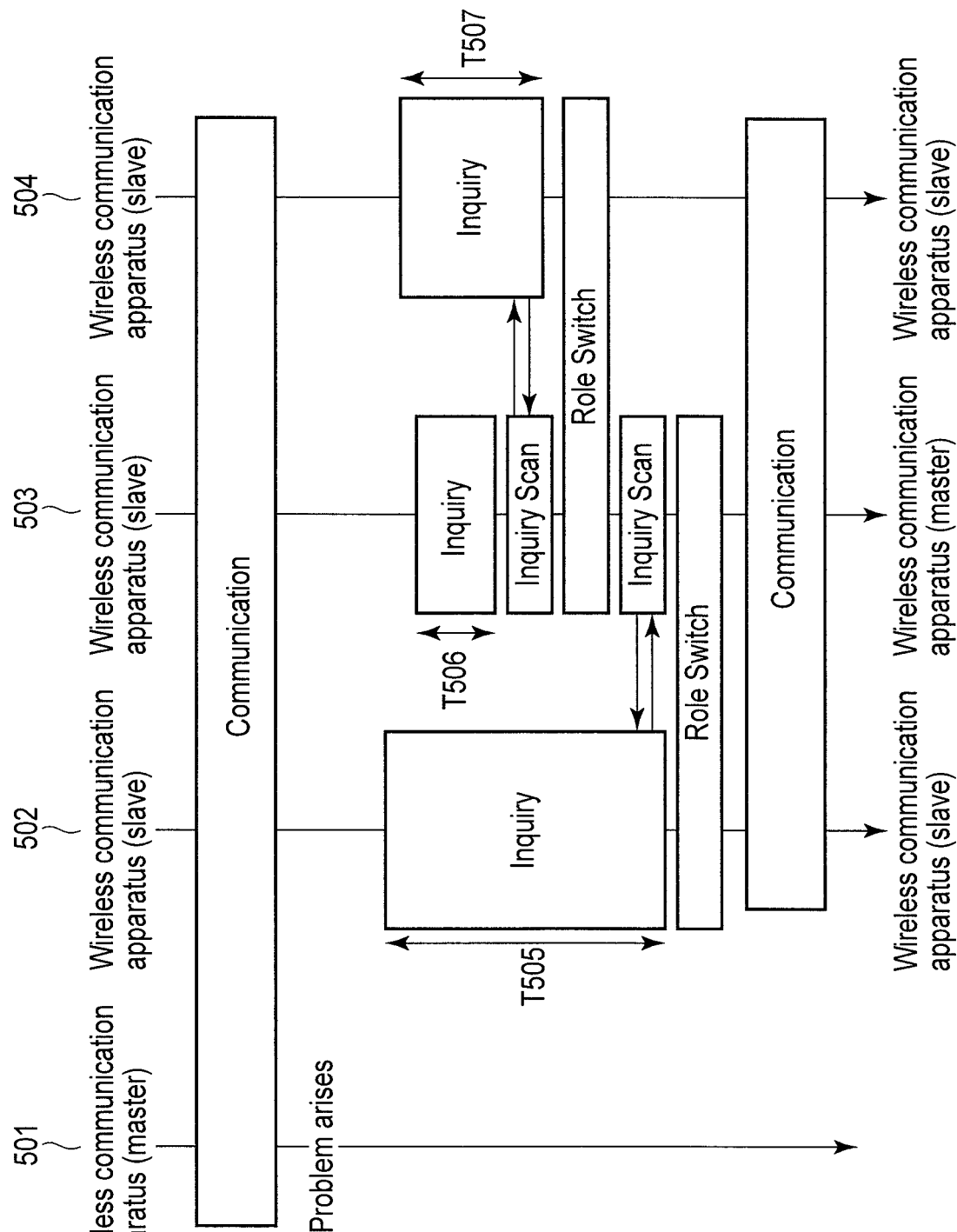
FIG. 6 is a sequence chart illustrating a variation of the operation shown in FIG. 5.

Wireless communication apparatuses 501, 502, 503 and 504 according to the present embodiment can operate in a manner as shown in FIG. 6. In the example shown in FIG. 6, suppose wireless communication apparatus 501 initially operates as a master, and wireless communication apparatuses 502, 503 and 504 initially operate as slaves.

Suppose, as shown in FIG. 6, wireless communication apparatus 501 suffers a breakdown while wireless communication apparatuses 501, 502, 503 and 504 perform communication. In such an event, each of wireless communication apparatus 502, 503 and 504 determines a disconnection of a wireless link with wireless communication apparatus 501 to detect the breakdown of wireless communication apparatus 501. Then, wireless communication apparatus 502, 503 and 504 perform the process shown in FIG. 11. It should be noted that wireless communication apparatuses 502, 503 and 504 detect the breakdown individually, so the timing of starting the process does not necessarily correspond among wireless communication apparatuses 502, 503 and 504.

Here, suppose that among wireless communication apparatuses 502, 503 and 504, wireless communication apparatus 503 has the highest master candidate priority, wireless communication apparatus 504 has the second highest master candidate priority, and wireless communication apparatus 502 has the lowest master candidate priority. In this case, thus, in step S1003, wireless communication apparatus 503 determines a shortest set time (T506), wireless communication apparatus 504 determines a second shortest set time (T507), and wireless communication apparatus 502 determines a longest set time (T505).

As a result, wireless communication apparatus 503 can perform Inquiry Scan at an earliest timing, regardless of the longest delay in starting Inquiry. Wireless communication apparatus (slave) 503 sequentially performs role switch after it sequentially connects to wireless communication apparatuses (masters) 504 and 502. In the end, a new network wherein the wireless communication apparatus 503 serves as a master is autonomously formed, and the communication can continue among wireless communication apparatuses 502, 503 and 504.

Figure 7:
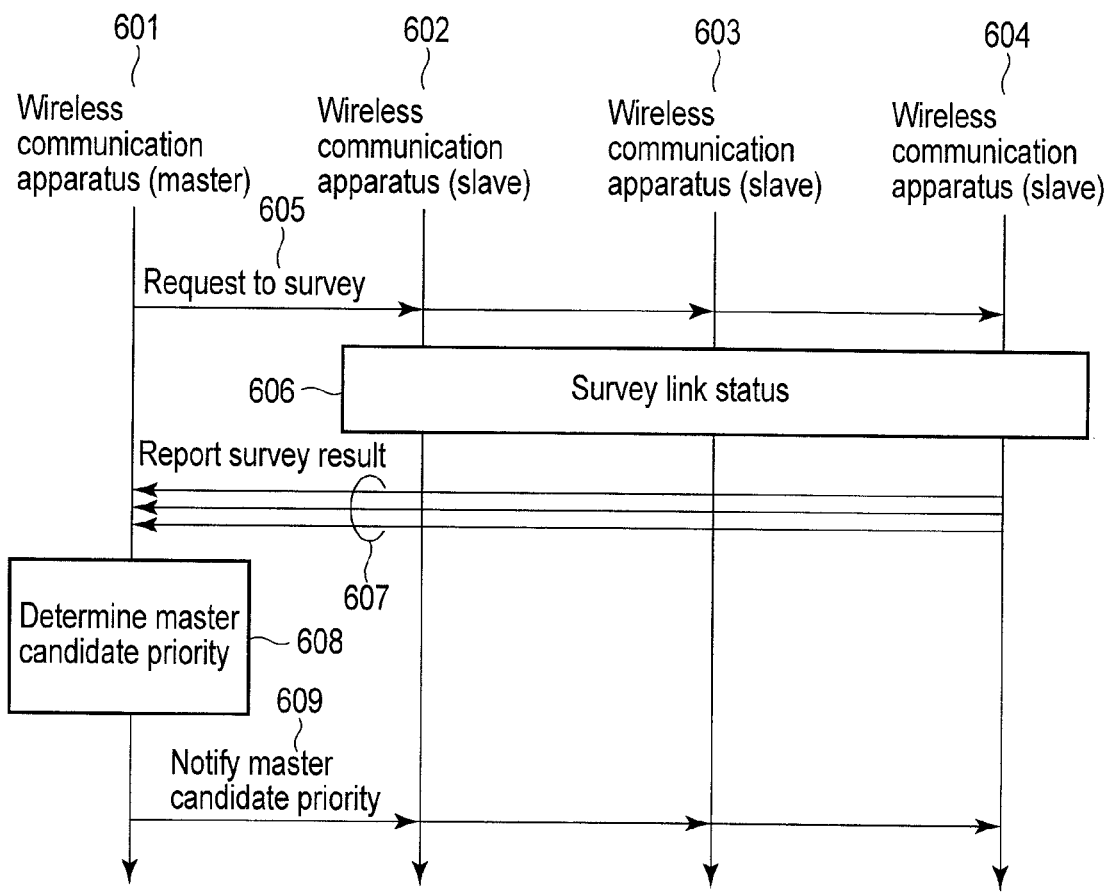
FIG. 7 shows an operation of autonomous determination of master candidate priority at the wireless communication apparatus according to the first embodiment.

As explained above, a master candidate priority may be manually set by an operator or user, or may be autonomously set through network. Regarding the latter case, a master candidate priority may be set in a manner as illustrated in FIG. 7. In the example shown in FIG. 7, wireless communication apparatus 601 operates as a master, and wireless communication apparatuses 602, 603 and 604 operate as slaves. The process shown in FIG. 7 may be performed only once after forming a main network having wireless communication apparatus 601 as a center, or may be performed once again, taking participation of a wireless communication apparatus (slave) in the main network or separation therefrom as a cue.

Wireless communication apparatus (master) 601 transmits a survey request message to wireless communication apparatus (slaves) 602, 603 and 604 (605). The survey request message may be transmitted by unicasting, broadcasting, or multicasting.

Upon reception of the survey request message, each of wireless communication apparatuses 602, 603 and 604 conducts a survey of a status of a wireless link with each of the other wireless communication apparatuses (slaves) in the network. The status of the wireless link can be evaluated by channel information such as a received power and a packet error rate, etc. Thus, the survey is conducted on a received power and a packet error rate.

More specifically, a wireless communication apparatus (slave) may measure and store a received power of a packet transmitted from each of the other wireless communication apparatuses (slaves). If the transmitter of a packet is unknown, it is preferable to store a time when the received power is measured.

Further, it may be possible for a wireless communication apparatus designated by wireless communication apparatus (master) 601 to transmit an IQ packet at a designated time, and for each of the other wireless communication apparatuses (slaves) to measure and store a received power of the IQ packet.

Further, it may be possible for a wireless communication apparatus designated by wireless communication apparatus 601 operates as a master at a designated time and forms a temporary network, and for a wireless communication apparatus (master or slave), within the temporary network, to measure and store a packet error rate or a received power at a wireless link.

According to Bluetooth, an ID of a wireless communication apparatus which is the transmitter of a packet is required to measure a packet error rate. Accordingly, in order to measure a packet error rate in a Bluetooth system, it is necessary for a wireless communication apparatus designated by the wireless communication apparatus operates as a master at a designated time to form a temporary piconet, or for wireless communication apparatus 601 notifies in advance each wireless communication apparatus in a piconet of the ID of the other wireless communication apparatuses (slaves).

When the survey of a status of a wireless link (606) is completed, wireless communication apparatuses 602, 603 and 604 report the survey result (607). Wireless communication apparatus 601 (more specifically, the system configuration setting unit 207) determines a master candidate priority for each of wireless communication apparatuses 602, 603 and 604 based on the reported survey result.

Preferably, to report a received power measured for a packet from unknown transmitter, the wireless communication apparatus (slave) reports the time when the received power is measured. With such a manner, wireless communication apparatus 601 can estimate at which wireless link the reported received power was measured from the communication history and reported measurement time.

Wireless communication apparatus 601 may derive a minimum received power at a wireless link among received powers at one or more wireless links between a target wireless communication apparatus (slave) and other wireless communication apparatuses (slaves) as an evaluation value of the target wireless communication apparatus (slave). In addition, wireless communication apparatus 601 may determine a high master candidate priority which is given to a wireless communication apparatus (slave) in the descending order of the evaluation values.

Wireless communication apparatus 601 may derive a maximum value among the packet error rates of one or more wireless links between a target wireless communication apparatus (slave) and other wireless communication apparatuses (slaves) as an evaluation value for the target wireless communication apparatus (slave). Wireless communication apparatus 601 may determine a high master candidate priority to be given to a wireless communication apparatus (slave) in the ascending order of the evaluation value.

Wireless communication apparatus 601 may derive the number of effective links included in one or more wireless links between a target wireless communication apparatus (slave) and other wireless communication apparatuses (slaves) as an evaluation value for the target wireless communication apparatus (slave). Wireless communication apparatus 601 may determine a high master candidate priority to be given to wireless communication apparatuses (slaves) in the descending order of the evaluation value.

The number of effective links may be determined by comparison a threshold with received powers or packet error rates at one or more wireless links between a target wireless communication apparatus (slave) and other wireless communication apparatuses (slaves). For example, the wireless communication apparatus may count the total number of the wireless links with a received power exceeding a threshold, or may count the total number of the wireless link with a packet error rate being lower than a threshold.

Furthermore, wireless communication apparatus 601 may consider a type of power source of the target wireless communication apparatus (slave) or information of remaining power at a battery. Generally, a master consumes more power than a slave does. Accordingly, suitability of a target wireless communication apparatus (slave) for becoming a master can be evaluated with respect to stability of operation if the type of power source or information of remaining power at a battery is considered. In a use case where the phase of an alternating output of a power inverter connected to a slave is synchronized with the phase of an alternating output of a power inverter connected to a master, it is preferable to drive the master by a commercial power source as the master needs to provide reference timing information.

Accordingly, for example, if the target wireless communication apparatus (slave) is driven by a commercial power source, wireless communication apparatus 601 can determine a master candidate priority higher than in a case of driving the target wireless communication apparatus (slave) by a battery.

Furthermore, if the target wireless communication apparatus (slave) is driven by a battery, wireless communication apparatus 601 can determine a high master candidate priority as the remaining power at the battery increases.

Wireless communication apparatus 601 notifies wireless communication apparatuses 602, 603 and 604 of a master candidate priority determined for each of the apparatuses (609). Those master candidate priorities may be notified through unicasting, broadcasting, or multicasting. Each of wireless communication apparatuses 602, 603 and 604 stores the notified master candidate priority.

Wireless communication apparatus 601 does not necessarily notify all of the wireless communication apparatuses (slaves) of a master candidate priority. A master candidate priority may be notified only to a wireless communication apparatus (slave) to which a master candidate priority higher than a threshold is assigned, or to a predetermined number of wireless communication apparatuses (slaves) in the descending order of the master candidate priority. A wireless communication apparatus (slave) to which no master candidate priority is notified may operate as a slave automatically when performing the process shown in, for example, FIG. 4 or FIG. 11.

According to the above explanation, a master candidate priority is considered to be a relative value determined based on a comparison on evaluation values between wireless communication apparatuses (slaves). However, a master candidate priority may be an absolute value which is uniquely determined for an evaluation value of a wireless communication apparatus (slave).

According to FIG. 7, each of wireless communication apparatuses 602, 603 and 604 survey a wireless link status after receiving a survey request message; however, this operation may be modified. For example, wireless communication apparatuses 602, 603 and 604 can store a received power and a measurement time before receiving a survey request message, and may report the received power and the measurement time that they have stored once they receive a survey request message.

As explained above, the wireless communication apparatus according to the first embodiment autonomously forms a new network by performing Inquiry and performing Inquiry Scan based on a master candidate priority, when a problem occurs at a main network master while the apparatus operates as a slave. Thus, according to the wireless communication apparatus, it is easy to form a new network having a master with a high candidate priority as a center, and thus, a communication can be appropriately continued.

Various variations are possible for the present embodiment. For example, it is possible to apply the present embodiment to a wireless LAN on the basis of the example illustrated in FIGS. 4 and 5. Basically, in such variations, a master and a slave are replaced with an AP and a STA. In a wireless LAN, since a STA can use both of passive scan and active scan to connect to an AP, the following matters should be noted.

When passive scan is adopted, the Inquiry Scan in FIGS. 4 and 5 should be replaced with "beacon reception," and the Inquiry with "beacon transmission." Further, the IQ packet and the response packet should be replaced with "authentication request packet" and "authentication response packet."

The set time of the timer in step S302 (in other words, the duration of beacon reception) can be controlled through a parameter "MaxChannelTime."

When active scan is adopted, a STA transmits a probe request packet, and an AP that has an ESSID identical to the ESSID included in the probe request packet transmits a probe response packet. Accordingly, when active scan is adopted, the wireless communication apparatus (STA) needs to store an ESSID for other wireless communication apparatuses (STA) in advance in order to generate a probe request packet.

When active scan is adopted, the wireless communication apparatus repeatedly transmits a probe request packet including an ESSID. Duration of repeating the transmission of a probe request packet may be determined based on a master candidate priority. If a probe response packet cannot be received before the timer times out, the wireless communication apparatus switches its operation mode to an AP mode. If the wireless communication apparatus receives a probe request packet including an ESSID same as the wireless communication apparatus after the switching, the wireless communication apparatus transmits a probe response packet to the STA. Then, in a manner similar to the case of passive scan, the STA can connect to the AP when the STA transmits an authentication request packet and the AP transmits an authentication response packet.

Further, a master candidate priority may not be used for determining the duration of Inquiry or Inquiry Scan. For example, in the event of a problem at a main network master, it is possible to autonomously form a new network if a wireless communication apparatus having the highest master candidate priority conducts Inquiry automatically and the other wireless communication apparatus can perform Inquiry Scan automatically.

(Second Embodiment)

The wireless communication apparatus according to the first embodiment as described above forms a new network autonomously when a problem arises in a main network master while the apparatus itself operates as a slave. In contrast, the wireless communication apparatus according to the second embodiment forms an alternative network autonomously prior to a problem at the main network master, so as to make it possible to switch networks used for communications as needed.

As the wireless communication apparatus according to the present embodiment comprises structures similar to those of wireless communication apparatus 200 shown in FIG. 3, the same reference numerals will be used in the following explanation. However, it should be noted that the operation of the wireless communication apparatus according to the present embodiment is partially different from that of the wireless communication apparatus shown in FIG. 3.

Figure 8:
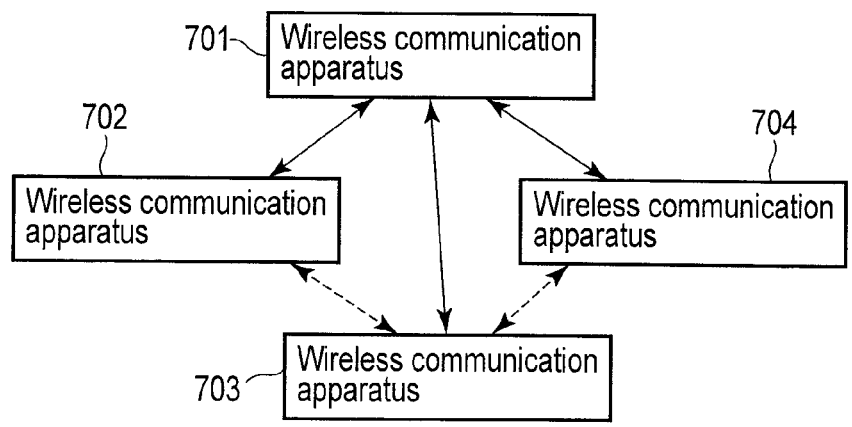
FIG. 8 is an explanatory drawing of an alternative piconet.

More specifically, wireless communication apparatuses 701, 702, 703 and 704 according to the present embodiment form a main network, as illustrated in FIG. 8. In FIG. 8, the solid-line arrows represent the wireless links constituting the main network. In the main network, wireless communication apparatus 701 operates as a master, and wireless communication apparatuses 702, 703 and 704 operate as slaves.

Further, in the example shown in FIG. 8, wireless communication apparatuses 702, 703 and 704 autonomously form the alternative network different from the main network. In FIG. 8, the broken-line arrows represent the wireless links constituting the alternative network. In the alternative network, wireless communication apparatus 703 operates as a master, and wireless communication apparatuses 702 and 704 operate as slaves. The alternative network is autonomously formed by wireless communication apparatuses 702, 703 and 704 before a problem arises at wireless communication apparatus 701, which is the main network master.

According to Bluetooth, a plurality of piconets sharing one or more wireless communication apparatuses is allowed to coexist. In other words, it is allowed for a wireless communication apparatus to participate in a plurality of piconets as a slave at the same time. Such multiple piconets are called "scatter net." Bluetooth system is assumed in the following explanation; however, the present embodiment is applicable to other wireless communication systems having a network topology similar to those of Bluetooth.

In the present embodiment, an alternative network (hereinafter, referred to as "alternative piconet") master is preferably a wireless communication apparatus having the highest master candidate priority. Since it is possible for a plurality of alternative piconets to coexist, a plurality of wireless communication apparatuses selected in the descending order of the master candidate priority may operate as a master in each of those alternative piconets. A master candidate priority may be determined in accordance with the same or similar procedure according to the first embodiment.

The alternative piconet may be formed, taking an instruction from a main network (hereinafter, referred to as "main piconet") master as a cue. For example, the alternative piconet may be formed if the main piconet master designates a slave (for example, a slave with the highest master candidate priority), and the designated slave conducts Inquiry and the other slaves conduct Inquiry Scan. Alternatively, the main piconet master may designate a slave to conduct Inquiry Scan (for example, other slaves except for the one with the highest master candidate priority). Alternatively, each slave may operate in a manner as explained in the first embodiment when the main piconet master instructs all the slaves to form an alternative network.

Alternatively, the alternative piconet may be autonomously formed by the slaves in the main piconet. For example, each of the slaves in the main piconet may form an alternative piconet autonomously after a master candidate priority is notified from the main piconet master. For example, a slave which is notified of the highest master candidate priority may conduct Inquiry, and the other slaves may conduct Inquiry Scan. Alternatively, each slave may operate in a manner as explained in the first embodiment.

Preferably, the alternative piconet is formed avoiding interrupting communications on the main piconet as much as possible. On the other hand, the main piconet may be operated in a sniff mode, for example, for intermittent communications, while forming the alternative piconet.

After the formation, the alternative piconet requires minimum maintenance. Accordingly, after the alternative piconet is formed, communications is carried out on the main piconet, while communications on the alternative piconet is carried out as less frequently as possible only to maintain synchronization.

Figure 9:
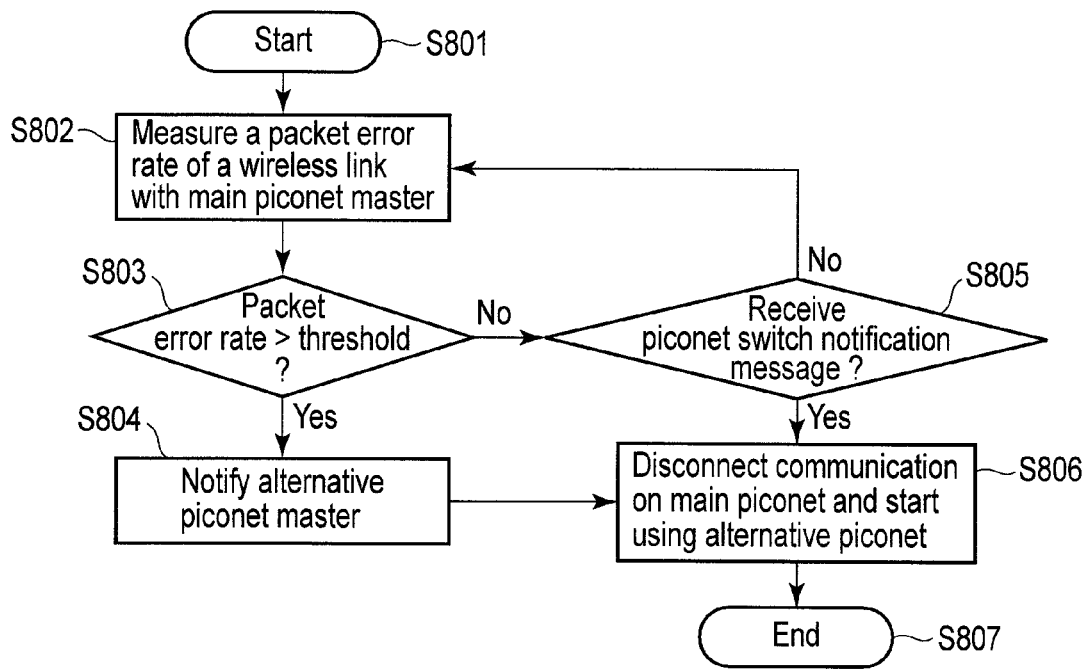
FIG. 9 is a flowchart explaining the operation of the slaves in the alternative piconet.

After forming the alternative piconet, the slaves in the alternative piconet operate in a manner shown in FIG. 9. When the operation begins (step S801), the link management unit 206 conducts a survey of status of the wireless link with the main piconet master (step S802). Typically, a packet error rate is measured in step S802; alternatively, a received power may be measured.

The system configuration setting unit 207 determines whether the status of the wireless link surveyed in step S802 is poor or not (step S803). Typically, the system configuration setting unit 207 determines the status is poor if the packet error rate exceeds a threshold, and the status is not poor if the packet error rate is below a threshold. A threshold is preferably set at a value more strictly than the conditions for determining disconnection of wireless links, because if a threshold is strict, it allows the apparatus to switch the piconet by detecting a sign indicating that the main piconet will become unusable before a problem actually occurs at the main piconet master. Alternatively, the system configuration setting unit 207 determines the status of the wireless link is poor if the received power is lower than the threshold, and the status is not poor if the received power exceeds the threshold.

In step S803, if the status of the wireless link is determined poor, the process proceeds to step S804. In step S804, the alternative piconet master is notified of the poor status of the wireless link, and the process proceeds to step S806.

In step S803, if the status of the wireless link is determined not poor, the process basically returns to step S802. However, if a piconet switch notification message is received from the alternative piconet master (step S805), the process proceeds to step S806.

In step S806, the link management unit 206 disconnects the wireless link with the main piconet master, and starts using the alternative piconet for communication. In other words, the process is finished when the link management unit 206 sets the alternative piconet as a new main piconet (step S807).

Figure 10:
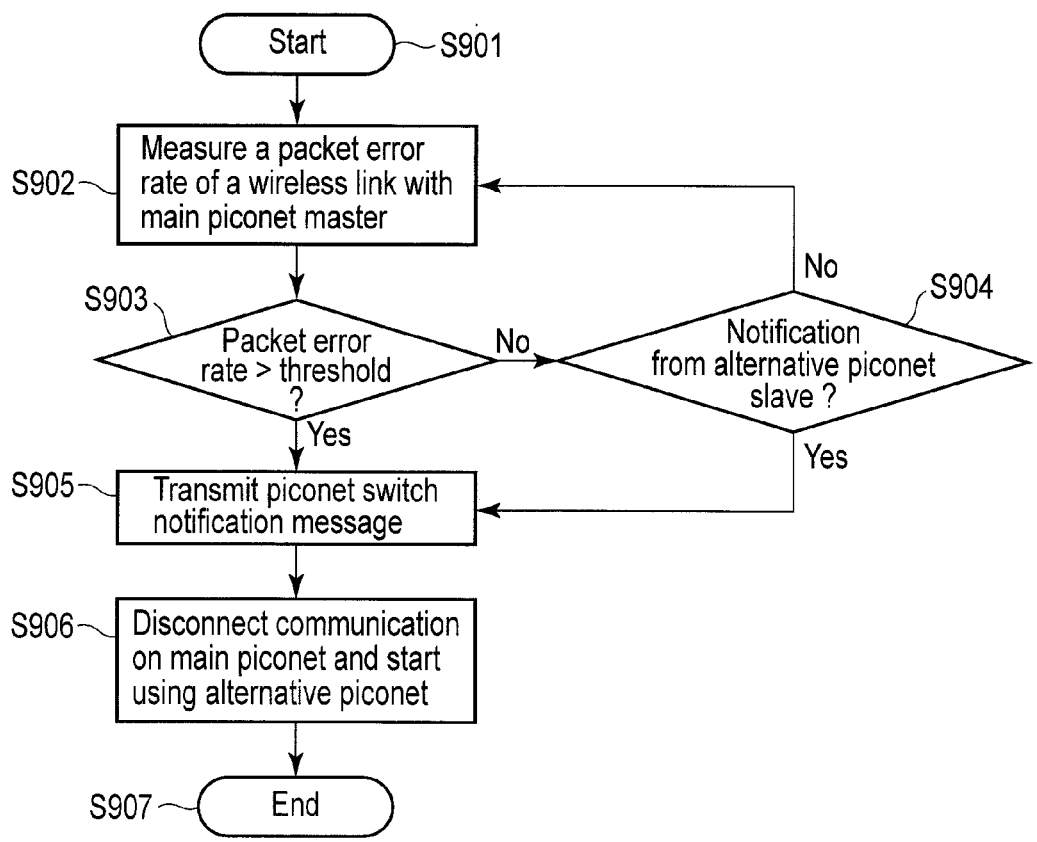
FIG. 10 is a flowchart explaining the operation of the master in the alternative piconet.

After the formation of the alternative piconet, the alternative piconet master operates in a manner as shown in FIG. 10. When the operation begins (step S901), the link management unit 206 conducts a survey of the status of the wireless link with the main piconet master (step S902). In step S902, the process same as or similar to the process in the step S802 may be performed.

The system configuration setting unit 207 determines whether the status of the wireless link surveyed in step S902 is poor or not (step S903). In step S903, the process same as or similar to the process in the step S803 may be performed.

In step S903, if the status of the wireless link is determined poor, the process proceeds to step S905. In step S905, all slaves in the alternative piconet are notified of a piconet switch notification message, and the process proceeds to step S906.

In step S903, if the status of the wireless link is determined not poor, the process basically returns to step S902. However, if the poor status of the wireless link is notified from any of the slaves in the alternative piconet (step S904), the process proceeds to step S905.

In step S906, the link management unit 206 disconnects the wireless link with the main piconet master, and starts using the alternative piconet for communication. In other words, the process is finished when the link management unit 206 sets the alternative piconet as a new main piconet (step S907).

As explained above, the wireless communication apparatus according to the second embodiment forms an alternative piconet autonomously prior to a problem at a main piconet master, while the apparatus operates as a slave. Thus, according to the wireless communication apparatus, if there is a sign of a problem at a main piconet master, or if a problem actually arises at a main piconet master, it is possible to switch the piconet to a new piconet immediately.

The processing in the above-described embodiments can be implemented using a general-purpose computer as basic hardware. A program implementing the processing in each of the above-described embodiments may be stored in a computer readable storage medium for provision. The program is stored in the storage medium as a file in an installable or executable format. The storage medium is a magnetic disk, an optical disc (CD-ROM, CD-R, DVD, or the like), a magnetooptic disc (MO or the like), a semiconductor memory, or the like. That is, the storage medium may be in any format provided that a program can be stored in the storage medium and that a computer can read the program from the storage medium. Furthermore, the program implementing the processing in each of the above-described embodiments may be stored on a computer (server) connected to a network such as the Internet so as to be downloaded into a computer (client) via the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication apparatus, comprising:
a controller configured to manage wireless links and set system parameters,
wherein the controller (i) sets, upon determination of disconnection of a wireless link with a base station of a main network used for a communication, a duration for waiting for receiving a first signal related to formation of a new network based on a priority, (ii) when the duration is set, waits for receiving the first signal until the duration elapses, (iii) swithches an operation mode to a base station mode if the first signal is not received when the duration elapses, and (iv) repeatedly performs a process to transmit the first signal after the operation mode is switched to the base station mode,
wherein the controller sets a value for the duration such that the duration is shorter with increasing priority.

2. The apparatus according to claim 1, wherein a priority for a case in which the apparatus is driven by a commercial power source is determined to be higher than a priority for a case in which the apparatus is driven by a battery.

3. The apparatus according to claim 1, wherein the priority is determined based on a received power in one or more wireless links between the apparatus and other terminal stations around the apparatus.

4. The apparatus according to claim 1, wherein the priority is determined based on a packet error rate in one or more wireless links between the apparatus and other terminal stations around the apparatus.

5. The apparatus according to claim 1, wherein the priority is determined based on a number of effective links in one or more wireless links between the apparatus and other terminal stations around the apparatus.

6. A wireless communication apparatus, comprising:
a controller configured to manage wireless links and set system parameters,
wherein the controller (i) switches an operation mode to a base station mode upon determination of disconnection of a wireless link with a base station of a main network used for communications, and sets a duration for repeating transmission of a first signal related to formation of a new network based on a priority, (ii) repeatedly performs a process to transmit the first signal until the duration elapses, upon setting of the duration, (iii) switches the operation mode to a terminal station mode if no second signal which corresponds to a response to the first signal is received when the duration elapses, (iv) waits for receiving the first signal upon switching of the operation mode to the terminal station mode, and (v)

performs a process to transmit the second signal upon reception of the first signal, and performs a role switch, wherein the controller sets a value for the duration such that the duration is shorter with increasing priority.

7. The apparatus according to claim 6, wherein the controller further (vii) receives the first signal, and then performs a process to transmit the second signal after a time interval determined using a random number has elapsed, and (viii) sets a smaller upper limit for the random number in accordance with an increase in the priority.

* * * * *